US009006330B2

(12) United States Patent
Ahn et al.

(10) Patent No.: US 9,006,330 B2
(45) Date of Patent: Apr. 14, 2015

(54) THERMAL STABILIZER-FREE THERMOPLASTIC RESIN COMPOSITION AND METHOD OF PREPARING THE SAME

(71) Applicant: LG Chem, Ltd., Seoul (KR)

(72) Inventors: Bong Keun Ahn, Daejeon (KR); Eun Seon Park, Daejeon (KR); Keun Hoon Yoo, Daejeon (KR); Joo Byung Chai, Daejeon (KR); Yu Sung Jung, Daejeon (KR); Won Deok Han, Daejeon (KR); Tae Young Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/115,707

(22) PCT Filed: Dec. 6, 2012

(86) PCT No.: PCT/KR2012/010548
§ 371 (c)(1),
(2) Date: Nov. 5, 2013

(87) PCT Pub. No.: WO2013/105737
PCT Pub. Date: Jul. 18, 2013

(65) Prior Publication Data
US 2014/0094556 A1   Apr. 3, 2014

(30) Foreign Application Priority Data

Jan. 11, 2012 (KR) .................. 10-2012-0003342
Dec. 5, 2012 (KR) .................. 10-2012-0140020

(51) Int. Cl.
*C08L 51/04* (2006.01)
*C08F 2/24* (2006.01)
*C08F 279/04* (2006.01)
*C08L 25/12* (2006.01)

(52) U.S. Cl.
CPC .............. *C08L 51/04* (2013.01); *C08F 279/04* (2013.01); *C08L 25/12* (2013.01)

(58) Field of Classification Search
CPC .......... C08L 51/04; C08L 55/02; C08L 25/12; C08L 69/00; C08F 2/24
USPC ....................................... 524/504; 525/67, 70
See application file for complete search history.

(56) References Cited

U.S. PATENT DOCUMENTS

| 5,008,331 | A | * | 4/1991 | Kawashima et al. | 525/84 |
| 6,117,542 | A | * | 9/2000 | Nanba et al. | 428/327 |
| 6,117,969 | A | * | 9/2000 | Nanba et al. | 528/198 |
| 6,906,134 | B2 | * | 6/2005 | Chai et al. | 525/64 |
| 7,396,877 | B2 | * | 7/2008 | Cha et al. | 525/71 |

FOREIGN PATENT DOCUMENTS

| KR | 10-2002-0003434 A | 1/2002 |
| KR | 10-2004-0057408 A | 7/2004 |
| KR | 10-2004-0067424 A | 7/2004 |
| KR | 10-2006-0042465 A | 5/2006 |
| KR | 10-0653503 B1 | 12/2006 |
| KR | 10-0828723 B1 | 5/2008 |
| KR | 10-2008-0070399 A | 7/2008 |

* cited by examiner

*Primary Examiner* — Vu A Nguyen
(74) *Attorney, Agent, or Firm* — McKenna Long & Aldridge LLP

(57) ABSTRACT

Disclosed are a thermal stabilizer-free thermoplastic resin composition and a method of preparing the same. The thermal stabilizer-free thermoplastic resin composition has superior impact resistance, falling ball impact resistance and gloss without using a separate thermal stabilizer. Particularly, the thermal stabilizer-free thermoplastic resin composition improves production efficiency when applied to a squeezing dehydrator because the thermoplastic resin composition is prepared without using a drying process.

19 Claims, No Drawings

THERMAL STABILIZER-FREE THERMOPLASTIC RESIN COMPOSITION AND METHOD OF PREPARING THE SAME

This application is a 371 National Stage Application of International Application No. PCT/KR2012/010548, filed on Dec. 6, 2012, which claims priority to and the benefit of Korean Patent Application No. 10-2012-0003342, filed Jan. 11, 2012, and Korean Patent Application No. 10-2012-0140020, filed on Dec. 5, 2012, the entire contents of which are incorporated herein by reference.

TECHNICAL FIELD

The present invention relates to a thermal stabilizer-free thermoplastic resin composition and a method of preparing the same.

BACKGROUND ART

In general, in order to improve thermal stability and surface gloss of ABS copolymer resins or similar resins, an amount of thermal stabilizer added is increased or remaining monomers are removed by stripping ABS copolymer latexes, or water is further added during aggregation and dehydration to minimize a residual emulsifier content.

In addition, in order to improve impact resistance and falling ball impact resistance, generally, content of a rubber component is increased or an acrylonitrile content is increased during production of ABS copolymers. When the content of rubber component is increased, impact resistance and whiteness are improved, but, disadvantageously, molecular weight and graft ratio of resins are decreased and colorability is thus deteriorated. Furthermore, when the acrylonitrile content is increased, impact resistance and colorability are excellent, but resin whiteness is disadvantageously decreased.

In addition, a rubber-reinforced resin such as acrylonitrile-butadiene-styrene (ABS), methacrylate-butadiene-styrene (MBS) or acrylonitrile-styrene-acrylate (ASA) is generally produced by preparing a rubber-reinforced resin through emulsion polymerization, aggregating and drying the resin to obtain a powder, and primarily processing the powder with a resin such as styrene-acrylonitrile (hereinafter also referred to as "SAN") or polycarbonate (PC) into a pellet in an extruder. A moisture content of the rubber-reinforced resin added to the extruder used is generally 1% or less. In some cases, the primary processing may be carried out by a continuous process wherein a powder having a moisture content of about 30% after dehydration is mixed with SAN and PC in the extruder without the drying process. In this case, high moisture content causes problems such as variation in physical properties and deterioration in production efficiency.

Accordingly, an important factor in maintaining production efficiency and quality upon addition of a powder containing moisture to an extruder without a drying process is minimization of moisture content. A conventional centrifugal dehydrator is limited in terms in ability thereof to reduce moisture content.

This problem may be overcome by using a squeezing dehydrator. However, it should be considered that this squeezing dehydration may cause problems such as deterioration in thermal stability and deformation of resins because it entails a high-temperature and high-pressure process.

DISCLOSURE

Technical Problem

Therefore, the present invention provides a thermoplastic resin composition and a method of preparing the same. Specifically, one object of the present invention is to provide a thermoplastic resin composition which has superior thermal stability and surface gloss as well as excellent impact resistance and falling ball impact resistance in spite of not using a thermal stabilizer.

Another object of the present invention is to provide a method of preparing the thermoplastic resin composition which maintains high production efficiency in spite of not performing a drying process.

Technical Solution

In accordance with one aspect of the present invention, provided is a thermal stabilizer-free thermoplastic resin composition comprising a rubber-reinforced resin a) and a matrix resin b), wherein the rubber-reinforced resin a) comprises a rubber polymer latex having a large particle diameter, an aromatic vinyl compound, a vinyl cyanide compound and a reactive emulsifier (surfactant) as active ingredients and is an ABS thermoplastic resin obtained by graft copolymerization.

In accordance with another aspect of the present invention, provided is a method of preparing a thermoplastic resin composition comprising preparing the rubber-reinforced resin a), the ABS thermoplastic resin, as a thermal stabilizer-free graft copolymer latex having a moisture content of 45 to 70%, anti-oxidizing, aggregating and dehydrating the thermal stabilizer-free graft copolymer latex to obtain a graft copolymer latex having a moisture content of 20 to 40%, and adjusting a moisture content of the graft copolymer latex to 2 to 20% and mixing the graft copolymer latex with the matrix resin and a lubricant.

Hereinafter, the present invention will be described in detail.

The present invention is characterized in providing a thermoplastic resin composition which has superior impact resistance, falling ball impact resistance and gloss in spite of not using a thermal stabilizer and, in particular, increases production efficiency when applied to a squeezing dehydrator because the thermoplastic resin composition is prepared without using a drying process.

First, the thermal stabilizer-free thermoplastic resin composition according to the present invention comprises a rubber-reinforced resin a) and a matrix resin b).

As used herein, the term "thermal stabilizer-free thermoplastic resin composition" refers to a thermoplastic resin composition which does not comprise a thermal stabilizer, unless specifically mentioned otherwise.

The rubber-reinforced resin a) comprises a rubber polymer latex, an aromatic vinyl compound, a vinyl cyanide compound and a reactive emulsifier as active ingredients and corresponds to an ABS thermoplastic resin obtained by graft copolymerization.

Specifically, the rubber polymer may be a rubber latex having a large particle diameter obtained by preparing a rubber latex having a small particle diameter and then enlarging small particles of the rubber latex using an acid, but the rubber polymer is not limited thereto.

The rubber latex having a small particle diameter is prepared by batchwise adding 100 parts by weight of 1,3-butadiene, 1 to 4 parts by weight of an emulsifier, 0.1 to 0.6 parts by weight of a polymerization initiator, 0.1 to 1 part by weight of an electrolyte, 0.1 to 0.5 parts by weight of a molecular weight adjuster and 90 to 130 parts by weight of ion-exchanged water, reacting the ingredients for 7 to 12 hours at 50 to 65° C., further batchwise adding 0.05 to 1.2 parts by weight of a molecular weight adjuster to the resulting reaction solution and reacting the resulting mixture at 55 to 70° C. for 5 to 15 hours.

The rubber latex having a small particle diameter thus obtained satisfies a mean particle diameter range from 600 to 1,500 Å and a gel content range from 85 to 99% by weight. The gel content range enables graft copolymers to be effectively produced on the outside of rubber particles and thus provides superior impact strength and thermal stability.

The enlargement of particles may be carried out by adding 1 to 4 parts by weight of acetic acid, phosphoric acid, sulfuric acid or hydrochloric acid as the acid for enlarging the size of particles, or a polymer aggregation agent, to 100 parts by weight of the rubber latex having a small particle diameter for 0.1 to 5 hours or 0.5 to 2 hours. Alternatively, the enlargement of particles may be carried out by slowly adding the ingredients to the rubber latex for one hour.

The large-particle rubber polymer latex obtained by the particle enlargement specifically satisfies a particle diameter range from 2,500 to 5,000 Å, more specifically, from 2,500 to 3,800 Å, and a gel content range from 85 to 99% by weight. The particle diameter may be an average particle diameter or number-average particle diameter.

The large-particle rubber polymer latex is present in an amount of 60 to 75 parts by weight, based on 100 parts by weight in total of a monomer for the rubber-reinforced resin to provide a rubber-reinforced resin. As such, an effect of minimizing an amount of the squeezing-dehydrated resin added to the extruder can be obtained by maximizing rubber content.

Styrene, α-methylstyrene, p-methylstyrene, vinyl toluene, t-butyl styrene, chlorostyrene, a substituted derivative thereof or a combination thereof may be used as the aromatic vinyl compound according to the present invention, in an amount, specifically, of 18 to 28 parts by weight, more specifically, of 21 to 25 parts by weight, based on 100 parts by weight in total of the monomer for the rubber-reinforced resin, but the present invention is not limited thereto.

In particular, the aromatic vinyl compound is preferably added portionwise after or before elevation of polymerization temperature in order to secure polymerization stability, optimum mechanical properties through formation of suitable cells and thermal stability, as demonstrated from the following examples.

Acrylonitrile, methacrylonitrile, a substituted derivative thereof or a combination thereof may be used as the vinyl cyanide compound according to the present invention in an amount, specifically, of 5 to 15 parts by weight, more specifically, of 9 to 10 parts by weight, based on 100 parts by weight in total of the monomer for the rubber-reinforced resin, but the present invention is not limited thereto.

In particular, the vinyl cyanide compound is preferably added portionwise after or before elevation of polymerization temperature in order to secure polymerization stability, optimum mechanical properties through formation of suitable cells, and thermal stability, as demonstrated from the following examples.

The reactive emulsifier used in the present invention is comprised of the rubber-reinforced resin, thus functioning to minimize residual emulsifier content in the rubber-reinforced resin and thereby improve thermal stability and surface gloss without further adding a thermal stabilizer, to enhance compatibility with the matrix resin mixed in a subsequent stage and thereby provide an ABS thermoplastic resin with superior impact resistance and falling ball impact resistance.

An emulsifier having at least one functional group selected from the group consisting of carbonate, sulfonate and sulfate is preferably used as the reactive emulsifier having these actions. Examples of the emulsifier include, but are not limited to, sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid, dipotassium salt, sodium methallyl sulfonate and combinations thereof.

The reactive emulsifier is present in an amount of 0.001 to 2 parts by weight, based on 100 parts by weight in total of the monomer for the rubber-reinforced resin. When the content of the reactive emulsifier is lower than 0.001, it is not easy to secure polymerization stability, and when the content exceeds 2 parts by weight, thermal stability of resins is deteriorated due to high residual emulsifier content.

For reference, the residual emulsifier content range suited to the present invention is 19,000 ppm or less (about 65% by weight or less, in terms of an amount of emulsifier used, based on 100% by weight in total of emulsifier added as an example) or 1 to 19,000 ppm. In another example, the residual emulsifier content is preferably 17,500 ppm or less (about 55% by weight or less, in terms of an amount of emulsifier used, based on 100% by weight in total of emulsifier added as an example), or 1 to 17,500 ppm.

In addition, the rubber-reinforced resin a) used in the present invention may comprise mercaptan as a molecular weight adjuster. Specifically, n-octyl mercaptan, n-dodecyl mercaptan, t-dodecyl mercaptan or a combination thereof may be used. The molecular weight adjuster may be used in an amount of 0.1 to 1 parts by weight, based on 100 parts by weight in total of the monomer for the rubber-reinforced resin.

Furthermore, the rubber-reinforced resin a) may comprise, as a polymerization inhibitor, at least one of fat-soluble peroxide polymerization initiators such as cumene hydroperoxide, diisopropyl benzene hydroperoxide, t-butyl hydroperoxide and p-methane hydroperoxide, and redox polymerization initiators comprising a salt of iron (II), iron (III) cobalt (II) or cerium (IV) as a metal salt, and polysaccharide such as dextrose, glucose or protose, dihydroxyacetone or polyamine as a reducing agent. The polymerization inhibitor may be used in an amount of 0.05 to 0.5 parts by weight, based on 100 parts by weight in total of the monomer for the rubber-reinforced resin.

The thermal stabilizer-free thermoplastic resin composition is prepared by mixing 20 to 40 parts by weight of the rubber-reinforced resin a) with 60 to 80 parts by weight of at least one selected from a styrene-acrylonitrile copolymer and a polycarbonate resin, as the matrix resin b).

In particular, when the styrene-acrylonitrile copolymer is used as the matrix resin b), preferably, a weight-average molecular weight of the styrene-acrylonitrile copolymer is 60,000 to 200,000 g/mol, and acrylonitrile is contained in an amount of 15 to 40% by weight in the styrene-acrylonitrile copolymer. This is the reason that, when the weight-average molecular weight is lower than 60,000 g/mol, mechanical properties of the resin are deteriorated, when the weight-average molecular weight exceeds 200,000 g/mol, surface properties are deteriorated due to bad compatibility with the ABS resin, when the acrylonitrile content is lower than 15% by weight, impact resistance and chemical resistance are deteriorated, and when acrylonitrile content exceeds 40% by weight, the resin becomes yellowish.

Thus, in accordance with the present invention, as can be seen from Examples given later, Comparative Example 2 in which an Irganox-based thermal stabilizer such as IR1076 is used exhibits similar improvement effect of thermal stability to a case in which the thermal stabilizer according to the present invention is not used.

A method of preparing a thermoplastic resin composition employing the thermal stabilizer-free thermoplastic resin composition will be described in detail.

First, an ABS thermoplastic resin as the rubber-reinforced resin a) is prepared in the form of a thermal stabilizer-free graft copolymer latex having a moisture content of 45 to 70%.

A monomer mixture may be added continuously, batchwise or in combination thereof during graft copolymerization, but there is no limitation as to addition method. Preferably, in terms of reaction efficiency, 5 to 40% by weight of the monomer mixture is added batchwise in an early stage and the remaining monomer mixture is then added continuously.

This is demonstrated by Examples given later. That is, among the total monomers constituting the rubber-reinforced resin, the aromatic vinyl compound and the vinyl cyanide compound are first added in amounts of 5 parts by weight and 2 parts by weight, respectively, and are then added at an elevated temperature in amounts of 20 parts by weight and 8 parts by weight, respectively.

Preferably, the reactive emulsifier is continuously added at a polymerization conversion ratio of 65 to 75%. In this case, polymerization stability is not deteriorated and coagulum production is reduced (see the following Examples 1-4).

The graft polymerization time is preferably 3 hours or less. After polymerization, preferably, the polymerization conversion ratio is 98.5% or more and a weight-average molecular weight (Mw) of the polymer is 50,000 to 150,000 g/mol.

The obtained thermal stabilizer-free graft copolymer latex is subjected to anti-oxidization and aggregated to obtain a graft copolymer latex having a moisture content of 45 to 70%.

The anti-oxidization process is effectively performed by slowly adding a phenol, phosphorous or sulfur antioxidant emulsion having a particle diameter of 0.5 to 2 μm to the graft rubber latex of 40 to 80° C. and continuously stirring the mixture prior to the aggregation process.

The amount of antioxidant is 0.1 to 2 parts by weight with respect to 100 parts by weight of the graft rubber latex.

The aggregation process means a process of adding a metal salt or an acid to the graft rubber latex and then aging the mixture. $MgSO_4$, $CaCl_2$, $Al_2(SO_4)_3$, sulfuric acid, phosphoric acid, hydrochloric acid, a polymer aggregation agent or the like may be used in an amount of 1 to 4 parts by weight as an aggregation agent with respect to 100 parts by weight of the graft rubber latex.

As such, a moisture content of the graft rubber latex thus obtained is adjusted from 20 to 40%, specifically, to 2 to 20%, more specifically, to 2 to 10%, mixed with one of a styrene-acrylonitrile copolymer and a polycarbonate resin as the matrix resin and a lubricant and is then subjected to post-processing such as extrusion molding and/or injection molding. When the graft rubber latex has the moisture content range described above, the drying process is omitted based on the purpose of the present invention.

The moisture content of the graft rubber latex is adjusted to 2 to 20% by removing moisture from the graft rubber latex using a dehydrator, more specifically, a squeezing dehydrator to obtain a solid having a moisture content of 20 to 40%, preparing the solid into a dried powder by hot air dying and then charging the powder in an extruder, or charging a moist solid in the extruder and then subjecting to dehydration and moisture evaporation in the extruder.

Obtaining the thermoplastic resin composition by mixing 20 to 40 parts by weight of the graft copolymer having a moisture content of 2 to 20% with 60 to 80 parts by weight of the matrix resin is preferred in terms of improvement in production efficiency of post-processing such as extrusion molding and/or injection molding. For example, an article obtained by extrusion molding or injection molding of the thermoplastic resin composition in accordance with the method exhibits excellent thermal stability, gloss, impact resistance and falling ball impact resistance, as can be seen from the following examples.

The lubricant may be ethylene bisstearamide (EBA), magnesium stearate or the like and may be used in an amount of 0.1 to 5 parts by weight, with respect to 100 parts by weight in total of the graft copolymer and the matrix resin.

Effects of the Invention

As apparent from the fore-going, the present invention enables preparation of a thermoplastic resin composition which has a maximum rubber content and a minimum content of a residual emulsifier in an ABS resin through use of a reactive emulsifier during ABS graft copolymerization, thus exhibiting improved thermal stability and surface gloss, high compatibility with a styrene-acrylonitrile copolymer and thus superior impact resistance and falling ball impact resistance without further adding a thermal stabilizer.

BEST MODE

Hereinafter, preferred examples will be provided for better understanding of the present invention. These examples are only provided to illustrate the present invention and it will be apparent to those skilled in the art that various modifications and alternations are possible within the scope and technical range of the present invention. The modifications and alternations fall into the scope of claims attached herein.

EXAMPLE 1

Preparation of Graft Rubber Latex

First, 3 parts by weight of an aqueous acetic acid solution was slowly added for one hour to 100 parts by weight of a small-particle rubber latex polymer having a rubber particle diameter of 1,000 Å and a gel content of 97% by weight, to obtain a polybutadiene rubber latex having a rubber particle diameter of 3,400 Å and a gel content of 97% by weight.

For reference, particle diameter and particle diameter distribution were measured by dynamic laser light scattering using a Nicomp 370HPL (Nicomp, Inc. USA) apparatus.

The gel content was obtained by solidifying the rubber latex with a dilute acid or a metal salt, washing the latex, drying the latex at 60° C. in a vacuum oven for 24 hours, cutting the resulting rubber lump into small pieces, adding 1 g of the rubber piece to 100 g of toluene, storing the sample in a dark room at room temperature for 48 hours, separating a sol and a gel from the sample and measuring a content of the gel using the following Equation 1.

$$\text{Gel content (\%)} = \text{weight of insoluble matter (gel)}/\text{weight of sample} \times 100 \qquad \text{Equation 1}$$

Then, 65 parts by weight (based on solid content) of the polybutadiene rubber latex, 140 parts by weight of ion-exchanged water, 5 parts by weight of styrene and 2 parts by weight of acrylonitrile were added to a nitrogen-substituted polymerization reactor (autoclave), and 0.05 parts by weight of cumene hydroperoxide, 0.09 parts by weight of sodium pyrophosphate, 0.12 parts by weight of dextrose and 0.002 parts by weight of ferrous sulfate were added batchwise to the reactor while a temperature of the reactor was maintained at 50° C.

Subsequently, a mixture of 20 parts by weight of styrene, 8 parts by weight of acrylonitrile, 0.4 parts by weight of tertiary dodecylmercaptan and 0.12 parts by weight of cumene hydroperoxide was continuously added to the reactor for 2 hours while the temperature of the reactor was elevated to 75° C. After 2 hours, a polymerization conversion ratio reached 93%.

After continuous addition for 30 minutes (when polymerization conversion ratio reached 65 to 75%), 0.3 parts by weight of 2-acrylamido-2-methylpropane sulfonic acid (based on solid content, 20% aqueous solution, pH 9 (treated with NaOH)) was continuously added for 90 minutes to the reaction solution as a reactive emulsifier.

After completion of continuous addition (when the polymerization conversion ratio reached 93%), 0.06 parts by weight of cumene hydroperoxide, 0.04 parts by weight of sodium pyrophosphate, 0.06 parts by weight of dextrose and 0.001 parts by weight of ferrous sulfate were added to the reaction solution, the temperature of the reactor was elevated to 80° C. for 30 minutes, the temperature was maintained for 30 minutes and the reaction was completed. At this time, a polymerization conversion ratio was 99%, a solid content (indicator for stability of graft copolymer latex) was 0.03%, a graft ratio was 27% and a residual emulsifier content was 18,000 ppm.

For reference, the solid coagulum content was calculated using the following Equation 2.

Solid coagulum content (%)=[weight of coagulum produced in reactor (g)/total weight of rubber and monomer (g)]×100    Equation 2

When the solid coagulum content is 0.5% or higher, latex stability is extremely deteriorated and it is difficult to obtain a graft polymer suitable for the present invention due to great amount of coagulum.

The graft ratio (%) of the graft polymer was obtained as follows. The graft polymer latex was solidified, washed and dried to obtain a powder, 2 g of the powder was added to 300 ml of acetone, the mixture was stirred for 24 hours, the resulting solution was separated using a super-centrifuge and the separated acetone solution was added dropwise to methanol to obtain an un-grafted portion. The un-grafted portion was weighed and graft ratio was calculated in accordance with the following Equation 3.

Graft ratio (%)=weight of grafted monomer (g)/ weight of rubber (g)×100    Equation 3

When the graft ratio is 20% or less, it is not preferred in terms of deterioration in gloss.

A content (ppm) of residual emulsifier in the graft copolymer was measured as follows. 0.2 g of the graft copolymer powder was accurately charged in 50 ml vial, 10 mL of acetone was added to the powder, the sample was dissolved by sonication for 2 hours, and 30 ml of methanol was slowly added thereto to precipitate a polymer. Then, the polymer was sonicated for one hour to extract the additive, a supernatant was collected and then filtered, and a residual emulsifier content (ppm) was measured using HPLC/DAD/MSD (Agilent 1100 system).

At this time, a moisture content of the graft rubber latex was within the range from 50 to 60%.

Aggregation of Graft Rubber Latex 0.5 parts by weight of an antioxidant (Wingstay-L/IR1076=0.8/0.2) emulsion having a mean particle diameter of 0.9 μm was added to the graft rubber latex thus obtained, the latex was primarily aggregated in the presence of 1.3 parts by weight of $MgSO_4$ at 85° C. and secondarily aged at 97° C. to obtain a powdery graft polymer having a moisture content of 30%.

Preparation of Thermoplastic Resin Composition

The moisture content of the powdery graft copolymer was primarily adjusted from 30% to 5% in a squeezing dehydrator.

75 parts by weight of a styrene-acrylonitrile copolymer having a weight-average molecular weight of 140,000 g/mol and an acrylonitrile content of 24% by weight and 1.5 parts by weight of ethylene bisstearamide (EBA) as a lubricant were added to 25 parts by weight of the graft copolymer having the moisture content of 5%, followed by mixing and extrusion molding to prepare a sample having a final rubber content of 15%. Physical properties of the sample were measured and summarized in the following Table 1.

EXAMPLE 2

The same process as in Example 1 was repeated except that polyoxyethylene alkylphenyl ether ammonium sulfate (product name: HITENOL-BC) was used, instead of 2-acrylamido-2-methylpropane sulfonic acid, in the preparation of the graft rubber latex.

EXAMPLE 3

The same process as in Example 1 was repeated except that alkenyl C16-18 succinic acid, di-potassium salt (product name: Latemul ASK) was used, instead of 2-acrylamido-2-methylpropane sulfonic acid, in the preparation of the graft rubber latex.

EXAMPLE 4

The same process as in Example 1 was repeated except that, in the preparation of the graft rubber latex, 70 parts by weight (based on solid content) of the polybutadiene rubber latex, 140 parts by weight of ion-exchanged water, 4.2 parts by weight of styrene and 1.8 parts by weight of acrylonitrile were added to the reactor, and 0.05 parts by weight of cumene hydroperoxide, 0.09 parts by weight of sodium pyrophosphate, 0.12 parts by weight of dextrose and 0.002 parts by weight of ferrous sulfate were added batchwise while a temperature of the reactor was maintained at 50° C., subsequently, a mixture of 16.8 parts by weight of styrene, 7.2 parts by weight of acrylonitrile, 0.4 parts by weight of tertiary dodecylmercaptan and 0.12 parts by weight of cumene hydroperoxide was continuously added for 100 minutes to the reactor while the temperature of the reactor was elevated to 75° C., and after 100 minutes, a polymerization conversion ratio reached 90%, and after continuous addition for 30 minutes (when polymerization conversion ratio reached 65 to 75%), 0.3 parts by weight of 2-acrylamido-2-methylpropane sulfonic acid (based on solid content, 20% aqueous solution, pH 9 (treated with NaOH)) was continuously added for 70 minutes to the reaction solution as a reactive emulsifier (after 70 minutes, polymerization conversion ratio reached 70 to 80%).

EXAMPLE 5

The same process as in Example 1 was repeated except that, in the preparation of the graft rubber latex, after continuous addition for 30 minutes (when polymerization conversion ratio reached 65 to 75%), 2-acrylamido-2-methylpropane sulfonic acid (based on solid content, 20% aqueous solution, pH 9 (treated with NaOH)) was added as the reactive emulsifier in an amount of 0.001 parts by weight, instead of 0.3 parts by weight.

EXAMPLE 6

The same process as in Example 1 was repeated except that, in the preparation of the graft rubber latex, after continuous addition for 30 minutes (when polymerization conversion ratio reached 65 to 75%), 2-acrylamido-2-methylpropane sulfonic acid (based on solid content, 20% aqueous solution, pH 9 (treated with NaOH)) was added as the reactive emulsifier in an amount of 2 parts by weight, instead of 0.3 parts by weight.

COMPARATIVE EXAMPLE 1

The same process as in Example 1 was repeated except that, in the preparation of the graft rubber latex, 0.6 parts by weight of a fatty acid soap as a non-reactive emulsifier, instead of 2-acrylamido-2-methylpropane sulfonic acid, was continuously added for 90 minutes.

COMPARATIVE EXAMPLE 2

The same testing as in Example 1 was repeated except that 0.03 parts by weight of IR1076 was added as a conventional thermal stabilizer, and drying and compounding processes were sequentially performed.

COMPARATIVE EXAMPLE 3

The same process as in Example 1 was repeated except that, in the preparation of the graft rubber latex, 2-acrylamido-2-methylpropane sulfonic acid was added at a reaction temperature of 50° C. before elevation of the temperature, instead of at 30 minutes after the elevation of temperature.

[Measured Properties]

Physical properties of ABS samples produced in Examples 1 to 6 and Comparative Examples 1 to 3 were measured in accordance with the following method.

Izod impact strength: measured in accordance with ASTM D256 (sample thickness: ¼" inch)

Melt flow index (MI): measured in accordance with ASTM D1238 under the conditions of 220° C. and 10 kg Tensile strength: measured in accordance with ASTM D638.

Surface gloss: measured in accordance with ASTM D528 at an angle of 45°

Gloss retention: A pellet obtained from an extruder was retained in an injection molding machine for 15 minutes at 270° C. to yield a glossy sample. Gloss at 45° of the sample and a sample obtained by injection molding at 200° C. without retention were measured and deviation in gloss between the samples was obtained. As deviation value decreases, gloss retention is more superior.

Discoloration retention (ΔE): L, a and b before and after retention of a glossy sample obtained in the same manner as the method of measuring gloss retention were obtained using a Suga color computer and color variation upon retention was calculated by the following Equation 4.

$$\Delta E = \sqrt{(L'-L)^2 + (a'-a)^2 + (b'-b)^2} \quad \text{Equation 4}$$

Falling ball impact strength: measured in accordance with ASTM D3783.

TABLE 1

| | | Examples | | | | | | Comparative Examples. | | |
|---|---|---|---|---|---|---|---|---|---|---|
| 1 | 2 | 1 | 2 | 3 | 4 | 5 | 6 | 1 | 2 | 3 |
| Rubber latex | Particle diameter(Å)/ gel content(% by weight) | | | | 3400/97 | | | | | |
| | Content (parts by weight) | 65 | 65 | 65 | 70 | 65 | 65 | 65 | 65 | 65 |
| Addition method of monomer* mixture | Batchwise (first step)/ continuous (second step) | 7/28 | 7/28 | 7/28 | 6/24 | 7/28 | 7/28 | 7/28 | 7/28 | 7/28 |
| (Non) reactive emulsifier | Parts by weight | 0.3 | 0.3 | 0.3 | 0.3 | 0.001 | 2 | 0.6 | 0.3 | 0.3 |
| Polymerization results | Polymerization conversion ratio (%) | 99 | 98.9 | 98.9 | 99.2 | 98.5 | 99.1 | 97.5 | 98 | 97.5 |
| | Solid coagulum content (%) | 0.03 | 0.02 | 0.03 | 0.05 | 0.05 | 0.02 | 0.12 | 0.05 | 0.8 |
| | Graft ratio (%) | 27 | 26.5 | 27 | 25 | 26.5 | 27 | 19 | 26 | 22 |
| | Residual emulsifier content(ppm) | 18000 | 18500 | 19000 | 17500 | 17000 | 19000 | 23000 | 18500 | 18200 |
| Physical properties | Impact strength (kg·cm/cm) | 23.5 | 24.0 | 23.8 | 23.2 | 23.0 | 23.5 | 21.0 | 22.5 | 21.0 |
| | Flowability (g/10 min) | 21 | 20.8 | 21.3 | 21.3 | 20 | 22 | 20 | 21 | 20 |
| | Tensile strength kg/cm2) | 515 | 512 | 510 | 508 | 510 | 516 | 515 | 513 | 505 |

TABLE 1-continued

| | | Examples | | | | | | Comparative Examples | | |
|---|---|---|---|---|---|---|---|---|---|---|
| 1 | 2 | 1 | 2 | 3 | 4 | 5 | 6 | 1 | 2 | 3 |
| | Surface gloss | 109.5 | 108.5 | 108.8 | 108.2 | 106.5 | 107.5 | 106.5 | 108.0 | 106.0 |
| | Whiteness | 57 | 57 | 56 | 58 | 58 | 56 | 55 | 54 | 53 |
| | Gross retention | 2.5 | 2.6 | 2.8 | 2.1 | 2.5 | 4.0 | 5.5 | 3.8 | 2.7 |
| | Thermal discoloration retention | 3.5 | 3.6 | 3.8 | 3.3 | 3.4 | 3.8 | 6.2 | 4.0 | 3.8 |
| | Falling ball impact (F, N) | 4020 | 4025 | 4030 | 4000 | 4030 | 3960 | 3880 | 3800 | 3750 |
| | Falling ball impact (E, J) | 32 | 33 | 33 | 31 | 30 | 29 | 28 | 30 | 28 |

*total weight of styrene and acrylonitrile

As can be seen from Table 1, Examples 1 to 6 according to the present invention exhibited superior thermal stability and gloss without using a separate thermal stabilizer, and imparted superior impact resistance and falling ball impact resistance to ABS resins because they are prepared by a method excluding a drying process.

Meanwhile, it was seen that Comparative Example 1 using a non-reactive emulsifier rather than a reactive emulsifier was poor in terms of the overall properties including impact strength, flowability, surface gloss, whiteness, gross retention, thermal discoloration retention, falling ball impact resistance and the like, as compared to Examples 1 to 6.

In addition, it was seen that Comparative Example 2, to which a conventional thermal stabilizer was added, exhibited similar or identical physical properties, as compared to Examples 1 to 6 to which a thermal stabilizer was separately not added.

Furthermore, it was seen that Comparative Example 3, to which a reactive emulsifier was added at a different time, was poor in terms of properties including impact strength, flowability, surface gloss, whiteness falling ball impact resistance and the like, as compared to Examples 1 to 6.

The invention claimed is:

1. A thermal stabilizer-free thermoplastic resin composition comprising:
    a rubber-reinforced resin a); and
    a matrix resin b),
    wherein the rubber-reinforced resin a) comprises a rubber polymer latex, an aromatic vinyl compound, a vinyl cyanide compound and an emulsifier and is obtained by graft copolymerization, and
    wherein the emulsifier comprises at least one emulsifier selected from the group consisting of sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid dipotassium salt, and sodium methallyl sulfonate,
    wherein the rubber polymer latex has a particle diameter of between 2,500 and 5,000 Å and a gel content of 85 to 99% by weight, and wherein the rubber polymer latex is obtained aggregating a rubber polymer latex having a particle diameter between 600 and 1,500 Å and a gel content of 85 to 99% using an acid or a polymer aggregation agent, and
    wherein a moisture content of the rubber-reinforced resin is between 2 and 20%,
    wherein the emulsifier is included in an amount of 0.001 to 0.3 parts by weight based on 100 parts by weight in total of the rubber polymer latex, the aromatic vinyl compound and the vinyl cyanide compound contained in the rubber-reinforced resin, and
    wherein the residual emulsifier content in a rubber-reinforced resin a) is 19,000 ppm or less.

2. The thermal stabilizer-free thermoplastic resin composition according to claim 1, wherein the matrix resin b) comprises at least one selected from a styrene-acrylonitrile copolymer and a polycarbonate resin.

3. The thermal stabilizer-free thermoplastic resin composition according to claim 2, wherein the matrix resin b) comprises a styrene-acrylonitrile copolymer having a weight-average molecular weight of 60,000 to 200,000 g/mol and an acrylonitrile content of 15 to 40% by weight.

4. The thermal stabilizer-free thermoplastic resin composition according to claim 1, wherein the rubber polymer latex is present in an amount of 60 to 75 parts by weight, based on 100 parts by weight in total of the rubber polymer latex, the aromatic vinyl compound and the vinyl cyanide compound contained in the rubber-reinforced resin.

5. The thermal stabilizer-free thermoplastic resin composition according to claim 1, wherein the aromatic vinyl compound comprises 18 to 28 parts by weight of styrene, α-methylstyrene, p-methylstyrene, vinyl toluene, t-butyl styrene, chlorostyrene, a substituted derivative thereof or a combination thereof, based on 100 parts by weight in total of the rubber polymer latex, the aromatic vinyl compound and the vinyl cyanide compound contained in the rubber-reinforced resin.

6. The thermal stabilizer-free thermoplastic resin composition according to claim 1, wherein the vinyl cyanide compound comprises 5 to 15 parts by weight of acrylonitrile, methacrylonitrile, a substituted derivative thereof or a combination thereof, based on 100 parts by weight in total of the rubber polymer latex, the aromatic vinyl compound and the vinyl cyanide compound contained in the rubber-reinforced resin.

7. The thermal stabilizer-free thermoplastic resin composition according to claim 1, wherein the rubber-reinforced resin a) comprises 0.1 to 1 parts by weight of a molecular weight adjuster, based on 100 parts by weight in total of the rubber polymer latex, the aromatic vinyl compound and the vinyl cyanide compound contained in the rubber-reinforced resin.

8. The thermal stabilizer-free thermoplastic resin composition according to claim 1, wherein the rubber-reinforced resin a) comprises 0.05 to 0.5 parts by weight of a polymerization initiator, based on 100 parts by weight in total of the rubber polymer latex, the aromatic vinyl compound and the vinyl cyanide compound contained in the rubber-reinforced resin.

9. The thermal stabilizer-free thermoplastic resin composition according to claim 1, wherein 20 to 40 parts by weight of the rubber-reinforced resin a) is mixed with 60 to 80 parts by weight of the matrix resin b).

10. The thermal stabilizer-free thermoplastic resin composition according to claim 1, wherein a residual emulsifier content of the rubber-reinforced resin a) is 65% by weight or less, based on 100% by weight in total of the added emulsifier.

11. A method of preparing the thermoplastic resin composition of claim 1 comprising:
(a) preparing the rubber-reinforced resin a) as a thermal stabilizer-free graft copolymer latex having a moisture content of 45 to 70%;
(b) anti-oxidizing and aggregating the thermal stabilizer-free graft copolymer latex to reduce the moisture content to 20 to 40%; and
(c) adjusting the moisture content of the thermal stabilizer-free graft copolymer latex to obtain the rubber-reinforced resin a) having the moisture content of 2 to 20% and mixing the rubber-reinforced resin a) with the matrix resin b) and a lubricant.

12. The method according to claim 11, wherein step (a) further comprises:
adding batchwise 5 to 40% by weight of the total monomer constituting the rubber based on the total weight of the rubber polymer latex, the aromatic vinyl compound and the vinyl cyanide compound contained in the rubber-reinforced resin a); and
continuously adding the balance of monomer.

13. The method according to claim 11, wherein step (a) further comprises continuously adding the emulsifier when the polymerization conversion ratio reaches 60 to 75%.

14. The method according to claim 11, wherein the anti-oxidizing of step (b) is carried out by slowly adding at 40 to 80° C. and to the thermal stabilizer-free graft copolymer latex 0.1 to 2 parts by weight of a phenol, phosphorous or sulfur antioxidant emulsion having a particle diameter of 0.5 to 2 gm, based on 100 parts by weight in total of the rubber polymer latex, the aromatic vinyl compound and the vinyl cyanide compound contained in the rubber-reinforced resin a), and continuously stirring before the aggregation.

15. The method according to claim 11, wherein the aggregation of step (b) is carried out by adding, to the thermal stabilizer-free graft copolymer latex, 1 to 4 parts by weight of at least one selected from $MgSO_4$, $CaCl_2$, $Al_2(SO_4)_3$, sulfuric acid, phosphoric acid and hydrochloric acid, or a polymer aggregation agent, based on 100 parts by weight in total of the rubber polymer latex, the aromatic vinyl compound and the vinyl cyanide compound contained in the rubber-reinforced resin a).

16. The method according to claim 11, wherein, in step (c), the adjustment of the moisture content to 2 to 20% is carried out by dehydration.

17. The method according to claim 11, wherein, in step (c), 20 to 40 parts by weight of the rubber-reinforced resin a) having the moisture content of 2 to 20% is mixed with 60 to 80 parts by weight of the matrix resin b).

18. The method according to claim 11, wherein the lubricant added in step (c) is present in an amount of 0.1 to 5 parts by weight, based on 100 parts by weight in total of the rubber-reinforced resin a) and the matrix resin b).

19. The thermal stabilizer-free thermoplastic resin composition according to claim 1, wherein the rubber-reinforced resin a) is an ABS thermoplastic resin.

\* \* \* \* \*